United States Patent [19]

Sasaki

[11] Patent Number: 4,864,413
[45] Date of Patent: Sep. 5, 1989

[54] IMAGE PROCESSING SYSTEM HAVING A SELECTIVE MAGNIFICATION FUNCTION

[75] Inventor: Tomio Sasaki, Tokyo, Japan

[73] Assignee: Ricoh Company, Ltd., Tokyo, Japan

[21] Appl. No.: 150,296

[22] Filed: Jan. 29, 1988

[30] Foreign Application Priority Data

Jan. 29, 1987 [JP] Japan .................................. 62-17160

[51] Int. Cl.⁴ ........................ H04N 1/04; H04N 1/393
[52] U.S. Cl. .................................. 358/451; 358/456; 382/47
[58] Field of Search .................... 358/287, 283; 382/47

[56] References Cited

U.S. PATENT DOCUMENTS

4,417,805 11/1983 Kishi .................................... 358/287
4,679,096 7/1987 Nazashima .......................... 358/287

Primary Examiner—Edward L. Coles, Sr.
Assistant Examiner—Kim Yen Vu
Attorney, Agent, or Firm—Oblon, Spivak, McClelland, Maier & Neustadt

[57] ABSTRACT

An image processing system includes a density magnification processing unit for taking an average in density of two adjacent image data only at a point of change in the main scanning direction in a size enlargement mode. Thus, the density variation in the main scanning direction is made smoother.

3 Claims, 14 Drawing Sheets

IMAGE PROCESSING SYSTEM HAVING A SELECTIVE MAGNIFICATION FUNCTION

BACKGROUND OF THE INVENTION

1. Field of the Invention

This invention generally relates to a digital image signal processing system and method, and, in particular, to an image processing system using multiple image sensors for optically reading an original. More specifically, the present invention relates to an image processing system suitable for use in digital copiers, facsimiles, CAD apparatuses and filing input devices.

2. Description of the Prior Art

An optical image reading system using multiple image sensors is well known. In such an optical image reading system, multiple image sensors are operated at the same time to read segments of one scanning line simultaneously and the segmented image data are arranged in a line. With such a system, even if an original to be read is relatively large, in particular wide, in size, the original can be read at a high speed. However, since the segmented image data are integrated into one line within one scanning period, the integrated data must be processed at an increased speed. Thus, as the number of image sensors increase so as to accommodate a larger-sized original, the required processing speed for processing an integrated image data becomes higher. As a result, a high speed processor is required, which pushes up a cost. It is true that the image data for one line may be divided into two lines, i.e., even-numbered image data and odd-numbered image data, and these divided data may be processed in parallel at a reduced image processing rate. However, in this case, the image data obtained by a plurality of image sensors must be once integrated into a single line and then the image must be divided into a plurality of lines, so that the process tends to be complicated.

In particular, in an image processing system of this type, a magnifying processing in a size enlargement mode is carried out by either of (1) image data simple addition method and (2) image density conversion method. However, in the former method, there is a disadvantage in that ups and downs of an image become conspicuous; whereas, in the latter case, there is a disadvantage in that density magnification must be implemented using arithmetic equations, which tend to make an arithmetic circuit complicated in structure.

SUMMARY OF THE INVENTION

In accordance with one aspect of the present invention, there is provided an image processing system and method using a first plurality of image sensors, each disposed to read a predetermined segment of a scanning line, in which image data read by the first plurality of image sensors are arranged into a second plurality, which is different, typically smaller in number, from the first plurality, of line segments of image data. The first plural line segments of image data have a first data rate, and the second plural line segments of image data have second data rate, which is different from and typically higher than the first data rate. The second plural line segments of image data are then subjected to a desired processing, such as change of magnification, and, then, the second plural line segments of the thus processed image data may be integrated into a single line of image data. Preferably, the second plurality of line segments include left-half and right-half segments of a scanning line. Thus, in the preferred embodiment, the first plural line segments of image data are arranged into two line segments of image data prior to a required processing. In this case, an original to be read is placed with its center as a reference position, so that the left half line segment corresponds to the left half of the original and the right-half line segment corresponds to the right-half of the original. With this structure, a desired image processing, such as size change, i.e., change of magnification, can be carried out at high speed in parallel processing while maintaining a high image quality.

In the preferred embodiment, in order to convert the first plural line segments of image data into the second plural line segments of image data, the first plural line segments of image data are stored into memory means at the first data rate and the image data thus stored is then read out at the second data rate to thereby convert the first plural line segments of image data into the second plural line segments of image data. The second line segments of image data may then be subjected to a desired processing, such as change of rate of magnification, and, in this case, magnification data stored in a magnification ROM can be input as a clock signal into an image memory in which the image data is temporarily stored. With this structure, the image data may be enlarged or reduced in size depending on the nature of the magnification data used while keeping the image data divided in the second plural lines.

In accordance with another aspect of the present invention, the second plural line segments of image data for a first scan line and the second plural line segments of image data for a second scan line are arranged into first and second scan lines of image data in parallel without change of data rate. And, a desired processing, such as change of magnification, is applied to the parallel first and second lines of image data.

In accordance with a further aspect of the present invention, there is provided an image processing system having a selective magnification function, in which an average density value between the two adjacent data is produced only at a point of change to thereby make the resulting image smoother without conspicuous ups and downs.

It is therefore a primary object of the present invention to obviate the disadvantages of the prior art as described above and to provide an improved image processing system.

Another object of the present invention is to provide an improved image processing system using a plurality of image sensors for optically reading an original.

A further object of the present invention is to provide an improved optical reading system suitable for use in an image processing apparatus, such as a digital copier, a facsimile, a CAD system and a filing input apparatus.

A still further object of the present invention is to provide an improved image processing system using multiple image sensors, which is fast in operation and simple in structure and thus low at cost.

A still further object of the present invention is to provide an improved image processing system using multiple image sensors, which allows to apply any desired processing to image data at high speed and high image quality.

A still further object of the present invention is to provide an image processing system having a selective density magnification function.

BRIEF DESCRIPTION OF THE DRAWINGS

FIGS. 6(I) and 6(II) is a block diagram showing a magnification variation processing unit provided in the structure shown in FIG. 4;

FIGS. 7(I) and 7(II) is a timing chart which is useful for understanding the operation of the structure shown in FIGS. 6(I) and 6(II);

DESCRIPTION OF THE PREFERRED EMBODIMENTS

Figure 1:
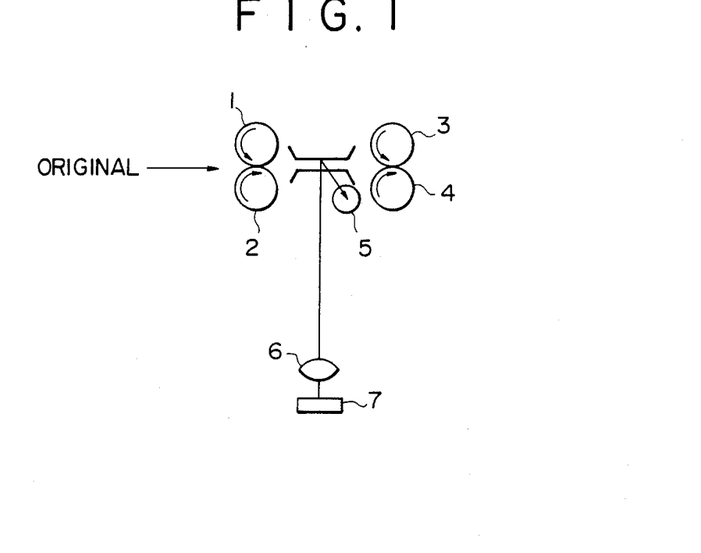
FIG. 1 is a schematic illustration showing an optical image reading system constructed in accordance with one embodiment of the present invention.

Referring now to FIG. 1, there is schematically shown an optical image reading system constructed in accordance with one embodiment of the present invention. As shown, the illustrated optical image reading system includes a plurality of transportation rollers 1 through 4, an illumination device 5, an optical lens 6 and an image sensor 7, such as a CCD. With this structure, an original to be optically read is transported by the transportation rollers 1 through 4 in the direction indicated by the arrow. During transportation, the original is illuminated by the illuminating device 5 and thus the original image is focused onto the CCD 7 through the optical lens 6. In this case, since the effective number of pixels readable per CCD 7 is fixed, the maximum reading width is determined when the original reading density or resolution is determined. Thus, if an original to be read is larger than this maximum reading width, use must be made of two or more CCDs.

Figure 2:
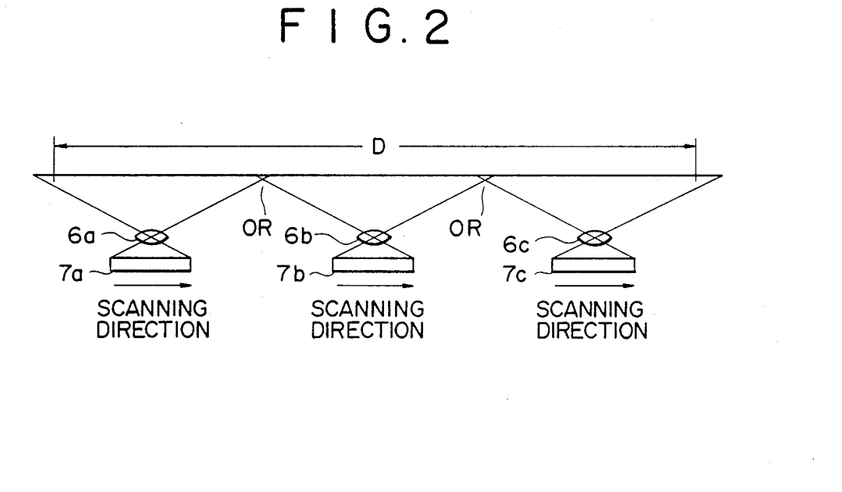
FIG. 2 is a schematic illustration showing a relationship between a maximum original width D and a plurality of image sensors disposed in the widthwise direction.

In one embodiment, it is assumed that the effective number of pixels readable per CCD 7 is 5,000 and the maximum width of an original to be read is 917 mm with the original reading density or resolution is 16 pixels/mm. Under the circumstances, since the maximum width of an original is 917 mm and the reading resolution is 16 pixels/mm, the maximum effective number of readable pixels is 14,672. Since the effective number of readable pixels per CCD 7 is 5,000, there must be provided three such CCDs so as to cover the maximum width of an original. FIG. 2 illustrates the case in which three such CCDs are provided as arranged in a line. In FIG. 2, D indicates the maximum width of an original while 6a through 6c indicating optical lenses, each provided for an associated CCD, 7a through 7c indicating CCDs and OR indicating an read overlapping region between two adjacent CCDs. In the case of FIG. 2, use is made of three image sensors or CCDs 7a through 7c in order to read an original having the maximum width D, and a corresponding segment of the original image is focused onto the corresponding one of the image sensors 7a through 7c by means of an associated optical lens 6a, 6b or 6c. It is to be noted that the read overlapping region OR is defined between two adjacent segments of the original image. This read overlapping region OR is adjusted such that it has the number of pixels equal to or less than $(15,000-14,672)/2 = 164$ so as to be able to read the maximum original width D. Segments of an original image data in a scan line formed on the respective CCDs 7a through 7c are output as analog data from the respective CCDs 7a through 7c; however, such analog data are extremely small in amplitude, they must be amplified.

Figure 3:
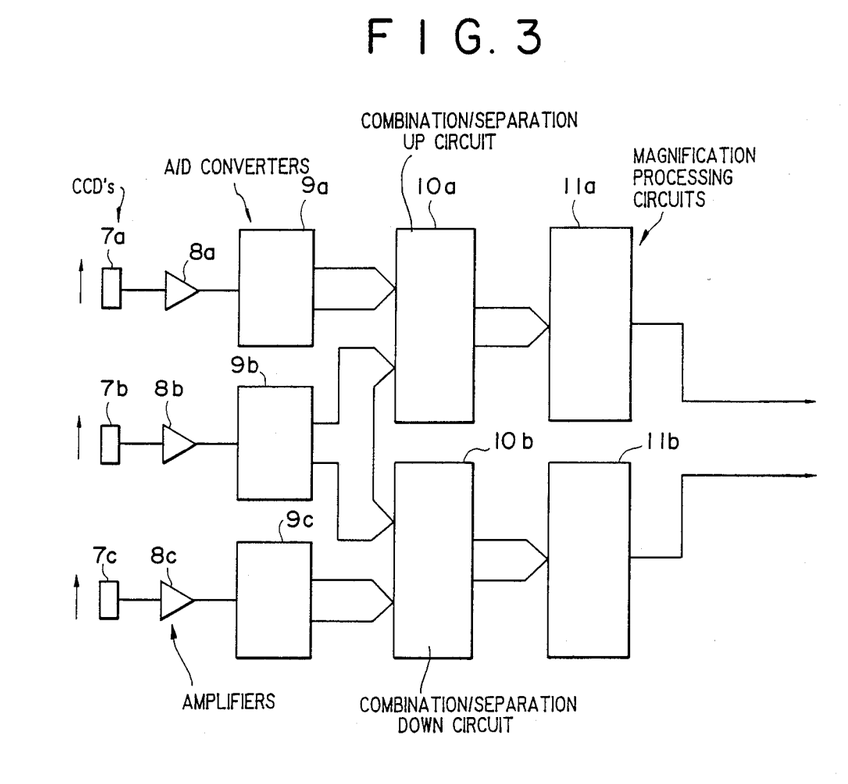
FIG. 3 is a block diagram showing the overall structure of an image processing system using multiple image sensors constructed in accordance with one embodiment of the present invention.

FIG. 3 illustrates in block form an image processing system for processing image data optically read by three CCDs constructed in accordance with one embodiment of the present invention. As shown, the illustrated system includes three CCDs 7a through 7c, three amplifiers 8a through 8c, three A/D converters 9a through 9c, and a pair of combination/separation circuits 10a and 10b. In operation, analog image outputs from the CCDs 7a through 7c are amplified by the amplifiers 8a through 8c, and, then, the thus amplified outputs are converted into digital image signals in multiple levels (e.g., 64 levels) for each pixel by the A/D converters 9a through 9c. After A/D conversion, the resulting digital image signal includes noise, due, for example, to illumination irregularities, stain of a contact glass on which an original to be read is transported and irregularities in the sensitivity of each of the CCDs, as superimposed on normal image data. For this reason, in order to rectify this noise problem, the so-called shading correction is typically carried out in the A/D converter. In this manner, an analog image output from each of the CCDs is amplified, subjected to shading correction and converted into multi-level digital image data, which is then input into the pair of combination/separation circuits 10a and 10b.

Figure 4:
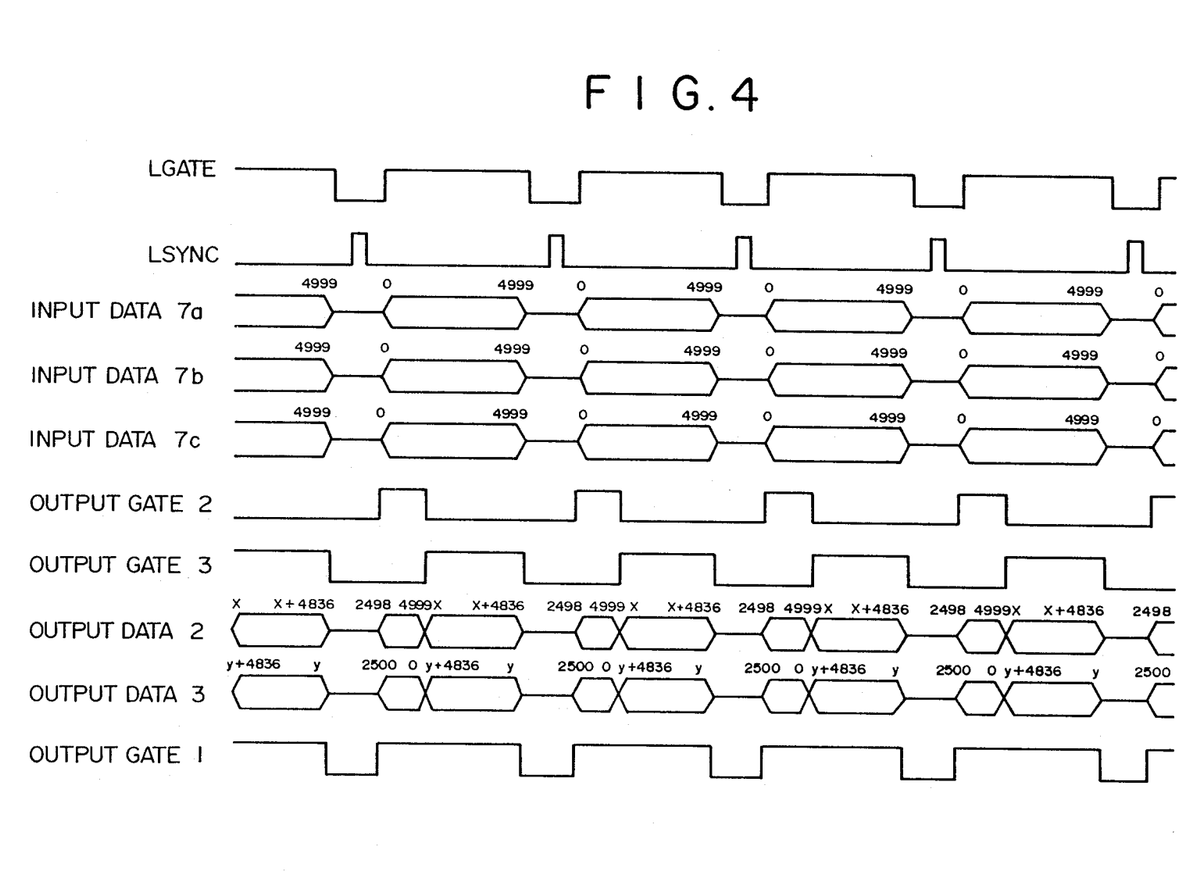
FIG. 4 is a timing chart which is useful for understanding the operation of the structure shown in FIG. 3.

In the above-described structure, it is to be noted that all of the CCDs are operated at the same time so that respective segments of a single scan line are read at the same time in parallel. And, thus, all of the CCDs sequentially output analog image data of the respective segments thus read at the same time. That is, as shown in FIG. 4, all of the CCDs 7a through 7c are synchronized in the optical or main scanning direction by a scanning sync signal LSYNC and valid data from the CCDs 7a through 7c are controlled by a control signal LGATE. It is assumed here that LSYNC is output 16 times per 1 mm in the auxiliary scanning direction, i.e., direction in which the original to be read is transported. And, thus, the resolution in the auxiliary scanning direction is also set at 16 pixels/mm, which is in agreement with the resolution of 16 pixels/mm in the main scanning direction. It is to be noted that the scanning sync signal LSYNC is output at a predetermined interval so as to maintain the charge storage time period of CCD at constant.

In the above-described structure, there are obtained three line segments of image data by the three CCDs 7a through 7c in parallel during a predetermined time period, or scan period, between two adjacent scanning sync signals LSYNC. As described previously, various processing operations, such as correction of read overlapping region between two adjacent CCDs, and various digital processing operations, such as change of magnification of image data, modulation translations function, (MTF) processing and smoothing processing, which are carried out after the analog processing operations must also be carried out during such a scan period. As a result, typically, the segmented image data output from the three CCDs are arranged into a single line of image data, to which correction of the read overlapping region is applied. However, when the image data output from three CCDs are arranged into one line of image data within a scan period, the processing speed per pixel of such one line of image data becomes tripled, which thus requires a high speed image processing system.

In the present embodiment, if 5,000 pixels are processed per CCD within a scan period of 312.5 micro seconds, the processing time per pixel is 62.5 ns/pixel. And, if the segmented image data from the three CCDs are combined into one line of image data within the scan period of 312.5 micro seconds, the processing time per pixel becomes 20.8 ns/pixel, which is three times higher than the original processing time. Under the condition, in accordance with the principle of one aspect of the present invention, the maximum original width D is divided into left-half and right-half segments from a center point, which corresponds in the present example to a center pixel which is the 2,449th pixel of the CCD 7b in FIG. 2. In this case, an original is supposed to be placed with its center as a reference. With this structure, the maximum of 7,500 pixel data for each left-half or right-half are processed during the scan period. Preferably, one of the left or right half is scanned in one direction from the center and the other is scanned in the opposite direction from the center at the same time. Thus, the image data of the left and right half segments of one line may be processed at the same time in parallel, so that the processing speed is prevented from becoming too high. Therefore, in accordance with the embodiment shown in FIG. 3, an original image is read with the image data of one line divided into three line segments by the three CCDs 7a through 7c, these three line segments of image data read by the three CCDs 7a through 7c are rearranged into two line segments of image data.

Figure 5A:
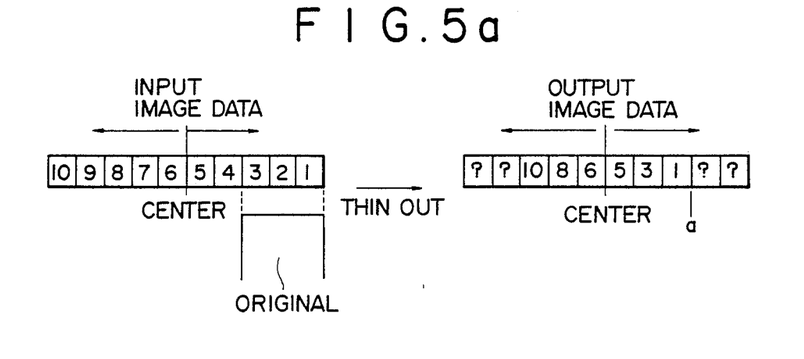
FIGS. 5a through 5c are illustrations which are useful for explaining division of image data of one scan line into segments.
Figure 5B:
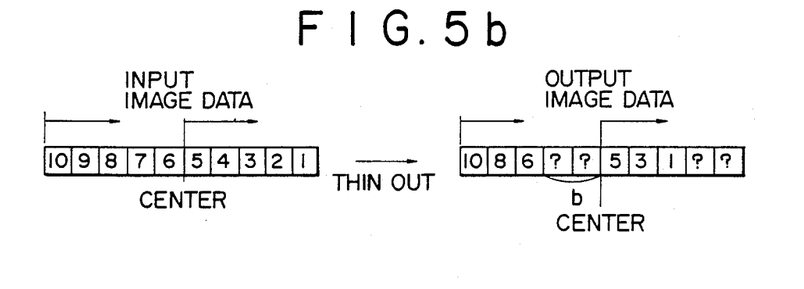
Figure 5C:
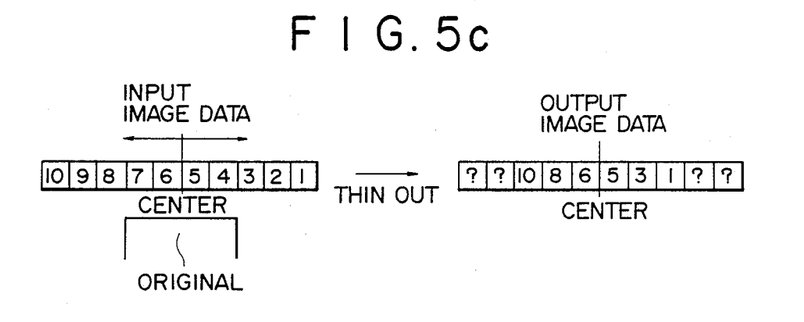

Besides, when the processing direction for one of the left-half or right-half segment of one line is set in one direction (e.g., combination/separation circuit 10a of FIG. 3) and the processing direction of the other segment is set in the opposite direction (e.g., combination/separation circuit 10b of FIG. 3), the connecting portion at the division between the two segments does not present any problem for subsequent processing. Described more in detail in this respect, if such processing as thinning out of pixels is to be carried out in the subsequent processing, (1) if an original is divided into two from its center using its one side edge as a reference and one half is scanned in one direction with the other scanned in the opposite direction, the location indicated by a must be calculated so as to determine where the reference surface of the original is located. On the other hand, (2) if an original image is divided from its center and both of the divided image segments are scanned in the same direction as shown in FIG. 5b, there will be created a mismatching section indicated by b regardless of where the original is placed. On the other hand, in accordance with the present invention, as shown in FIG. 5c, if an original image is divided from its center and one of the divided image segments is scanned in one direction with the other image segment scanned in the opposite direction, the reference of the original image is at its center and the divided image data segments can be connected without problem.

As can be understood from the above, in accordance with the principle of this aspect of the present invention, input image data of one line is divided into two line segments using the center of one line and the segmented image data are scanned at the same time in opposite directions. Thus, the image data can be processed at high speed and without presenting any problem, such as unnatural or strange connection of the segmented image data when combined.

Referring to FIG. 4, as described previously, during a scan period of scanning sync signal LSYNC, image data obtained by the three CCDs 7a through 7c are processed in parallel and a valid region of data is determined by a scanning control signal LGATE. These segmented image data obtained from CCD's a 7b and 7c are input into the two-division processing combination/separation up circuit 10a and the segmented image data obtained from CCD's 7b and 7a are input into the two-division processing combination/separation down circuit 10b. An output data 2 output from the combination/separation circuit 10a includes 2,498th to 4,999th pixels for the input data from CCD 7b and xth to $(x+4,836)$th pixels for the input data from CCD 7c. And, the output timing is controlled by output gates 2 and 3. On the other hand, an output data 3 output from the combination/separation down circuit 10b includes 2,500th to 0th pixels for the input data from CCD 7b and $(y+4.836)$th to yth pixels for the input data from CCD 7a, and the output timing is similarly controlled by output gates 2 and 3.

It is to be noted that the output data from the combination/separation up circuit 10a is output in one direction of the main scanning direction at a speed which is 1.5 times faster than the data input speed. On the other hand, the combination/separation down circuit 10b outputs image data in the opposite direction of the main scanning direction at a speed which is 1.5 times faster than the data input speed. It should also be noted that the values of x and y indicate respective overlapping amounts between the center CCD 7b and the left and right CCDs 7a and 7c while the number of valid pixels for the center CCD 7b is set at 5,000. As set forth before, the value of each of x and y must be set to be equal to or less than 164. Furthermore, the reason why the central division data of the center CCD 7b are overlapping is because these are the data required for the next stage of image processing unit.

In addition, the image data output from the combination/separation circuits 10a and 10b are input into respective magnification processing circuits 11a and 11b.

As described above, in the present embodiment, the valid data length at the image output unit is 612 mm and the data is output at pixel density of 16 lines/mm, so that 9,792 pixels are required. As described before, the output data from the three CCDs 7a through 7c are output at the same time during a LSYNC scan period and these three strings of output data are converted into two strings of data by the combination/separation circuits 10a and 10b. Thus, the data of 7,500 pixels is processed in a time period of 312.5 micro seconds, which corresponds to the image frequency of 24 MHz. In this case, since the converted two strings of image data (9.792/2=4,896 pixels) must be output to an image output unit (not shown) within 312.5 micro seconds, the image frequency to the image output unit is approximately at 16 MHz. The magnification processing units 11a and 11b shown in FIG. 3 also take care of this image frequency conversion between input image data and output image data.

Figures 6, 6I:
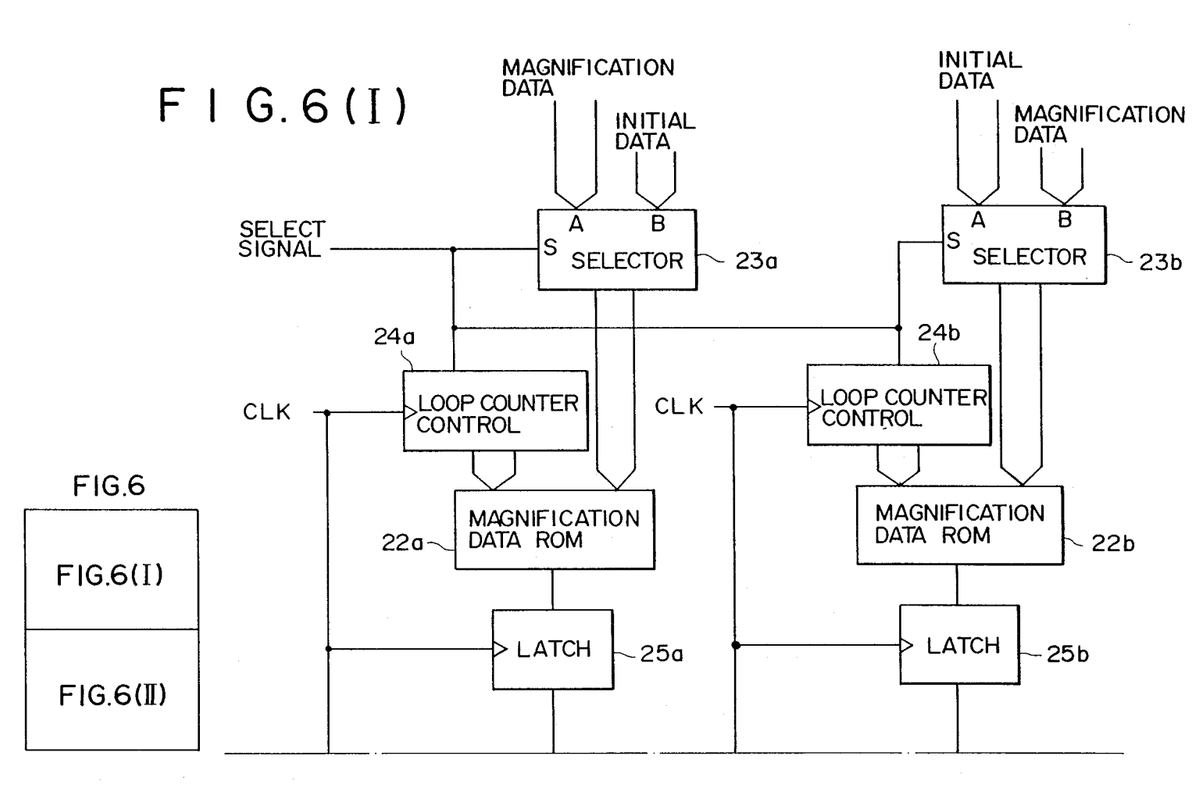
Figure 6:
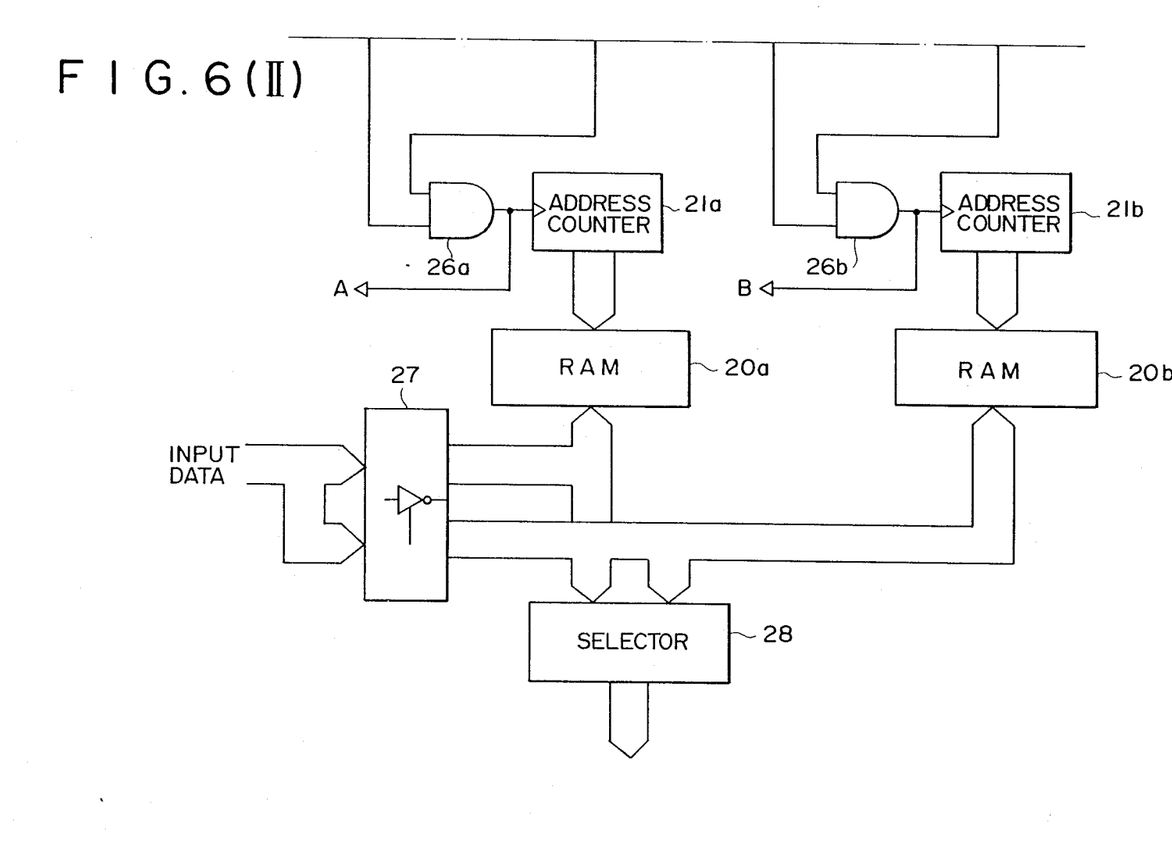

FIGS. 6(I) and 6(II) illustrate illustrates mostly in blocks a magnification processing system suitable for use in the structure shown in FIG. 3. The illustrated magnification processing system includes a pair of toggle RAMs 20a and 20b, a pair of address counters 21a and 21b and a pair of magnification data ROMs 22a and 22b which supply clock signals to the address counters 21a and 21b, respectively. The magnification data ROMs 22a and 22b store and output various magnification data to the associated address counters 21a and 21b in the form of clock signals. For example, in the case of unity magnification. i.e., the correspondence between an address and a data of each of RAMs 20a and 20b being 1:1, when the RAMs 20a and 20b operate in a write mode, the clock signals supplied to the address counters.21a and 21b have the image frequency of 24 MHz; on the other hand, while the RAMs 20a and 20b operate in a read out mode, a clock signal having the image frequency of 16 MHz is applied as an address of a RAM, so that the input data stored in the RAM 20a or 20b is output in accordance with the image frequency of the read out mode, whereby conversion of image frequency between input and output data is carried out with unity magnification. This corresponds to the case indicated by (X 1) in FIGS. 7(I) and 7(II).

On the other hand, a reduction in size can be obtained if the image frequency of 24 MHz is thinned out during the write-in mode in the relationship between the address and the data for the RAMs 20a and 20b. For example, if a clock signal CLK is thinned out as in the case of CLK (X 0.5) in FIG. 7(I), during write mode, the address counter 21a or 21b receives a thinned out clock with respect to the original 24 MHz. On the other hand, the image data still corresponds to the clock signal of 24 MHz. Thus, for the case of magnification (X 0.5), as the address increases by +1, the image data advances by two, whereby data 1 corresponds to address 1 and data 3 corresponds to address 2, so that the image data written into the RAMs 20a and 20b are thinned out. Under the condition, when the image data thus stored in the RAMs 20a and 20b is read out using a clock signal of 16 MHz as supplied from the associated address counters 21a and 21b, there is obtained an output data having the image frequency of 16 MHz and the magnification of X 0.5. This corresponds to the case indicated by (X 0.5) in FIG. 7.

Figure 7:
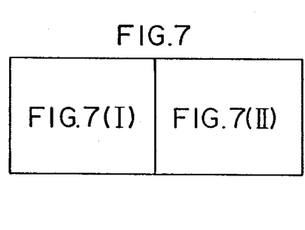
Figure 7I:
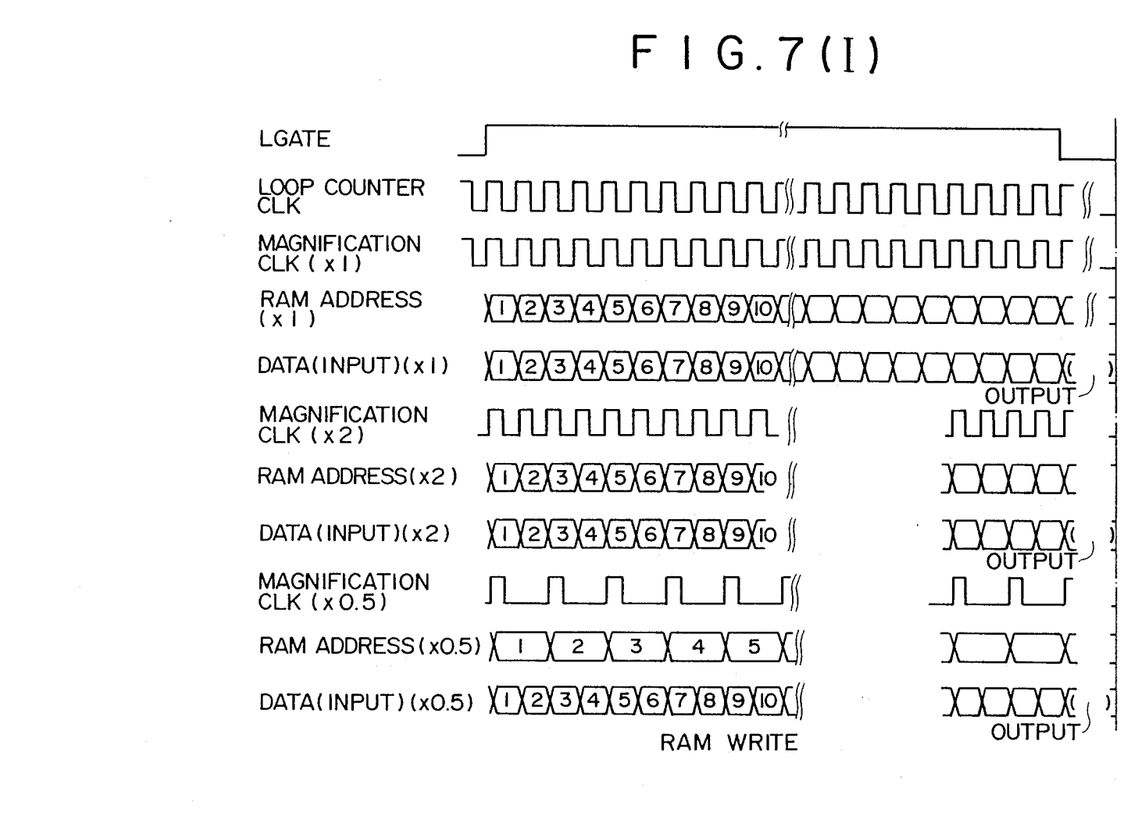

On the other hand, in the case of increasing the rate of magnification, i.e., enlargement in size, during write mode, image data is stored into the RAMs 20a and 20b using a clock of 24 MHz as a clock of the associated address counters 21a and 21b, and, then, during read mode, a clock having the image frequency of 16 MHz is thinned out before being applied to the associated address counters 21a and 21b. For example, if a clock signal CLK is thinned out as shown for clock CLK (X 2) in FIG. 7(II), during read mode, the address counters 21a and 21b supply a thinned-out clock to the associated RAMs 20a and 20b. However, since the image data stored in the RAMs 20a and 20b correspond to a clock of 16 MHz, if a read mode is carried out with CLK (X 2), as the address increases by +1, the same image data is output twice, so that the image data is enlarged in size.

In accordance with a magnification variation scheme of this aspect of the present invention, in a size reduction mode, i.e., magnification being smaller than unity, a write clock is thinned out from the original image frequency of 24 MHz and a read clock having the original image frequency of 16 MHz is applied; whereas, in a size enlargement mode, i.e., magnification being larger than unity, a read clock is thinned out from the original image frequency of 16 MHz and a write clock having the original image frequency of 24 MHz is used. In this manner, simply by thinning out a clock to be applied to the RAM 20a or 20b during a read mode or a write mode, the image data may be reduced or enlarged in size, i.e., magnification of image data being varied.

Figure 8:
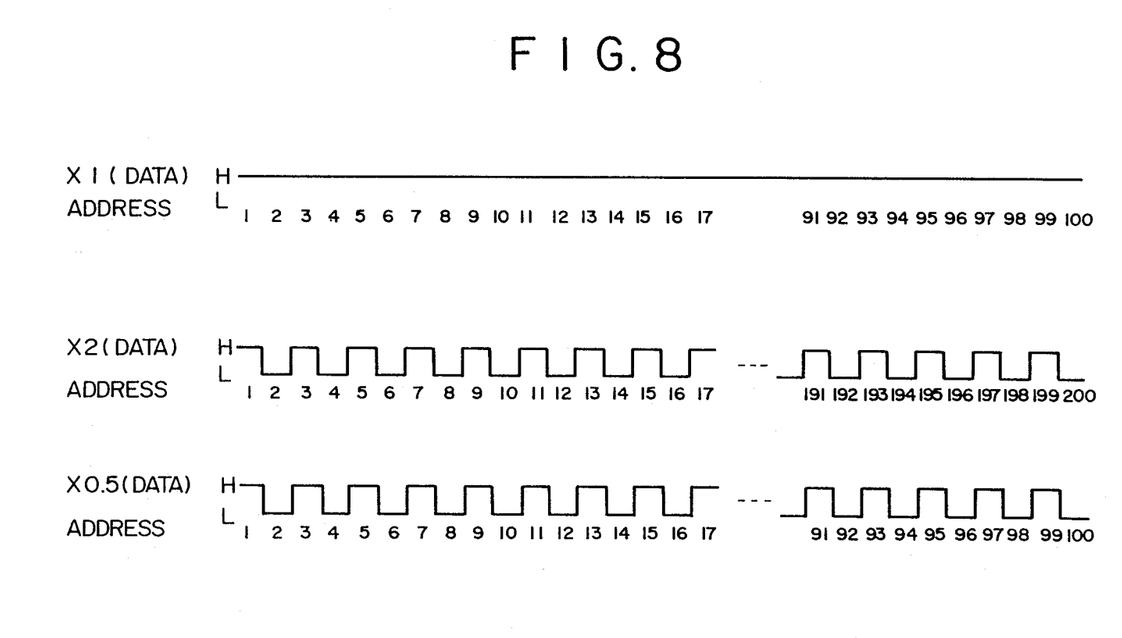
FIG. 8 is an illustration showing several examples of magnification data stored in the magnification data ROM provided in the structure shown in FIGS. 6(I) and 6(II)

In addition, in the above-described magnification processing system, switching between write and read clocks (24 MHz/16 MHz) is synchronized with switching between write and read modes of the toggle RAMs 20a and 20b. And, various magnification data are stored in the magnification data ROMs 22a and 22b. FIG. 8 illustrates magnification data stored in the magnification ROMs 22a and 22b. In the case of unity magnification, i.e., X 1, the data is all H, and this data is ANDed with a clock at gate 26a or 26b, so that a clock same as the clock applied to the gate 26a or 26b is applied to the address counter 21a or 21b. On the other hand, in the case of magnification of X 0.5, H and L appear alternately, so that 50 among 100 becomes H, so that when clock CLK is ANDed with this magnification data at gate 26a or 26b, there is obtained an address clock which is a half of the original clock CLK. Moreover, in the case of magnification of X 2, 100 among 200 become H, and when ANDed at gate 26a or 26b, there is obtained an address clock which is twice the original clock CLK.

It is to be noted that in the case of non-unity magnification, i.e., X 0.5 or X 2 in the above-described examples, switching of ROM data is carried out in association with switching between write and read modes of RAMs 20a and 20b. The magnification processing system shown in FIG. 6 also includes a pair of selectors 23a and 23b which serve to switch the upper address of the magnification data ROMs 22a and 22b, thereby switching ROM data between write and read modes. An initial data applied to each of the selectors 23a and 23b is so set to supply ROM data (all H) which causes the clocks applied to the address counters 21a and 21b become the original clocks. As may be understood from the above, size reduction or size enlargement can be carried out with 1% as a unit with size reduction data/100=size reduction clock in a size reduction mode, i.e., magnification being smaller than unity and 100/size enlargement data=size enlargement clock in a size enlargement mode, i.e., magnification being larger than unity.

Figure 9:
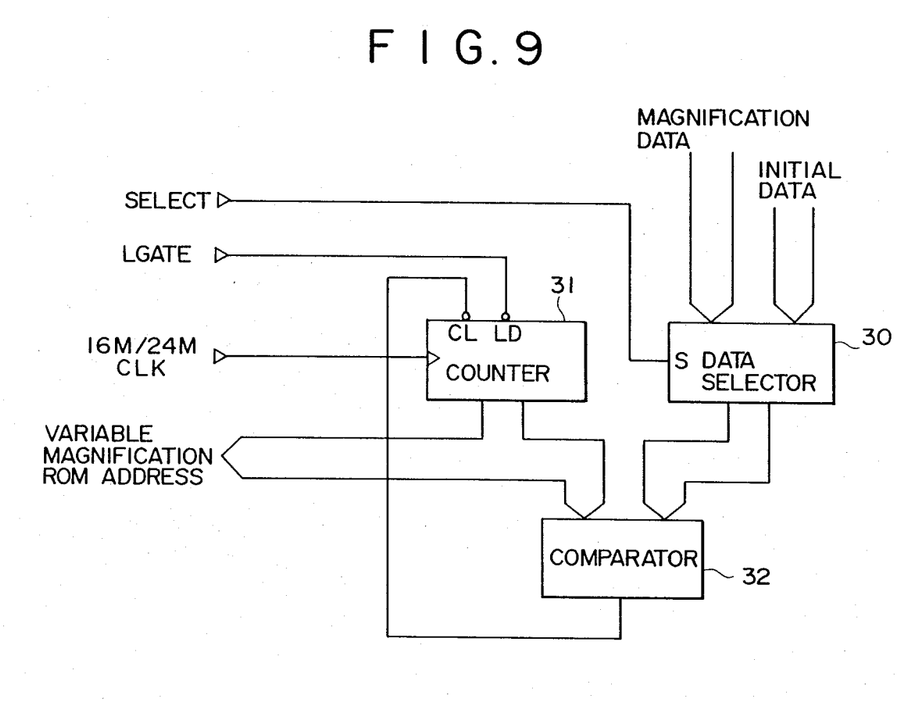
FIGS. 9 and 10 are block diagrams each showing an example of loop counter control unit suitable for use in the structure shown in FIGS. 6(I) and 6(II)
Figure 10:
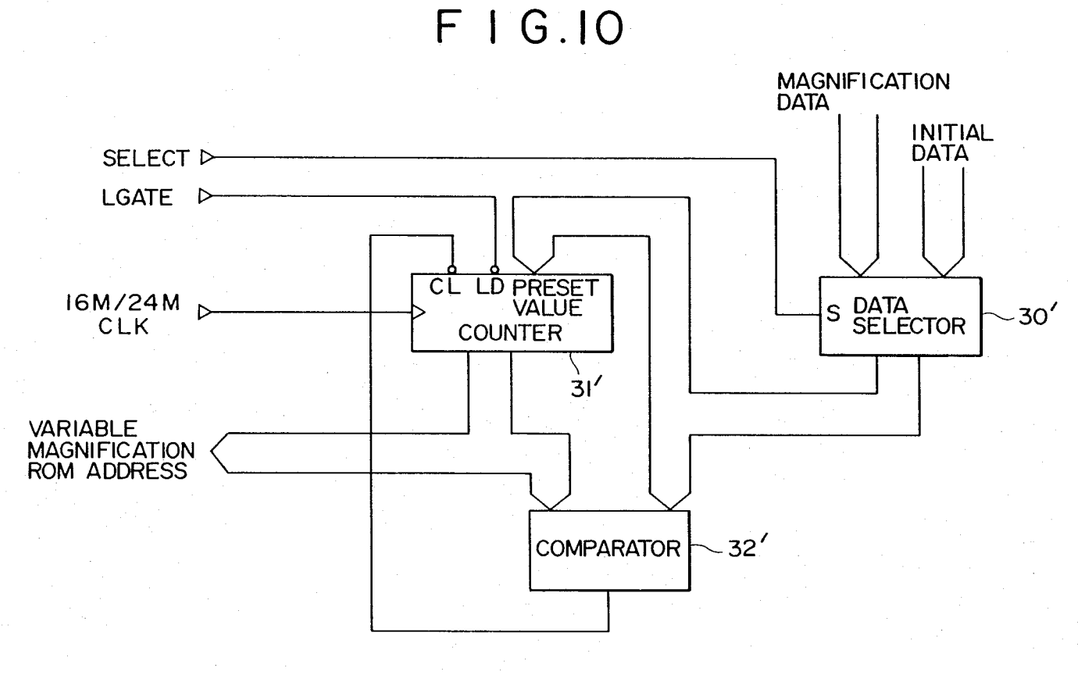

The magnification processing system shown in FIGS. 6(I) and 6(II) also includes a pair of loop counter controls 24a and 24b, a pair of latches 25a and 25b, a 3-state buffer 27 for switching input data into the RAMs 20a and 20b and an output data selector 28 for selecting data output from the RAMs 20a and 20b. FIG. 9 illustrates in block form the detailed structure of the loop counter control 24a or 24b of the associated magnification data ROM 22a or 22b. As shown in FIG. 9, the loop counter control 24a or 24b includes a data selector 30 which selects either a magnification data or an initial data (here, this is assumed to be 100) in accordance with a control signal indicating whether the magnification data is above 100 or less than 100. In the case where the magnification data indicates a value less than 100, i.e., a size reduction mode, since an amount of thinning out data from the clock to the address counter 21a or 21b of the associated RAM 20a or 20b relative to the clock of the counter 31 is determined, an initial data is selected (in this case, a 100 loop counter is established). On the other hand, in the case of a size enlargement mode, if implemented in the same manner as in the case of size reduction mode, there results 100/enlargement data amount at the loop counter 31, which produces an error. Accordingly, in a size enlargement mode, if the enlargement data amount is always set at 100 as one loop enlargement data amount, there results enlargement data amount/100 and the clock of address counter 21a or 21b of the associated RAM 20a or 20b accurately agrees with the magnification.

As described above, in order to establish a 100 loop counter 31 in a size reduction mode and a loop counter with a size enlargement data amount in a size enlargement mode, the value of the counter 31 is compared with the value of the selector 30 at a comparator, and, if the value of the counter 31 has been found to be larger than the value of the selector 30, a clear signal of the counter 31 is output from the comparator 32 to thereby establish a loop counter. The output data of this counter 31 is coupled to a lower address of ROMs 22a and 22b.

Figure 11:
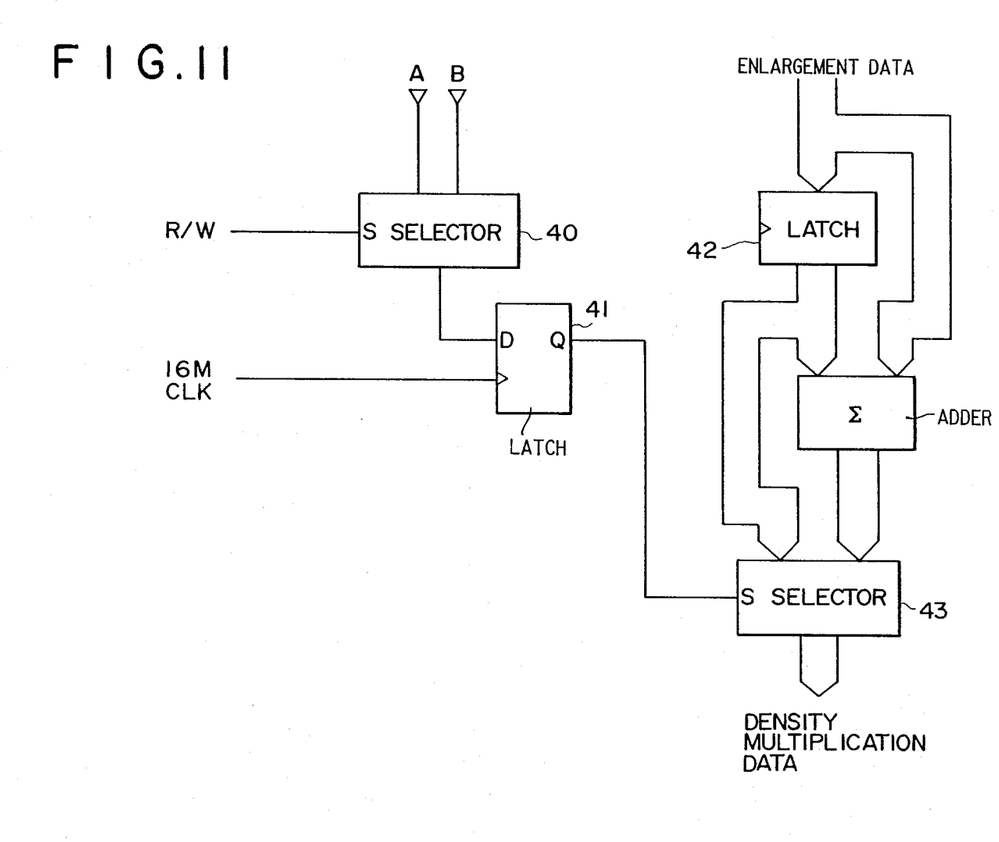
FIG. 11 is a block diagram showing a size enlargement density magnification unit constructed in accordance with a further embodiment of the present invention.
Figure 12:
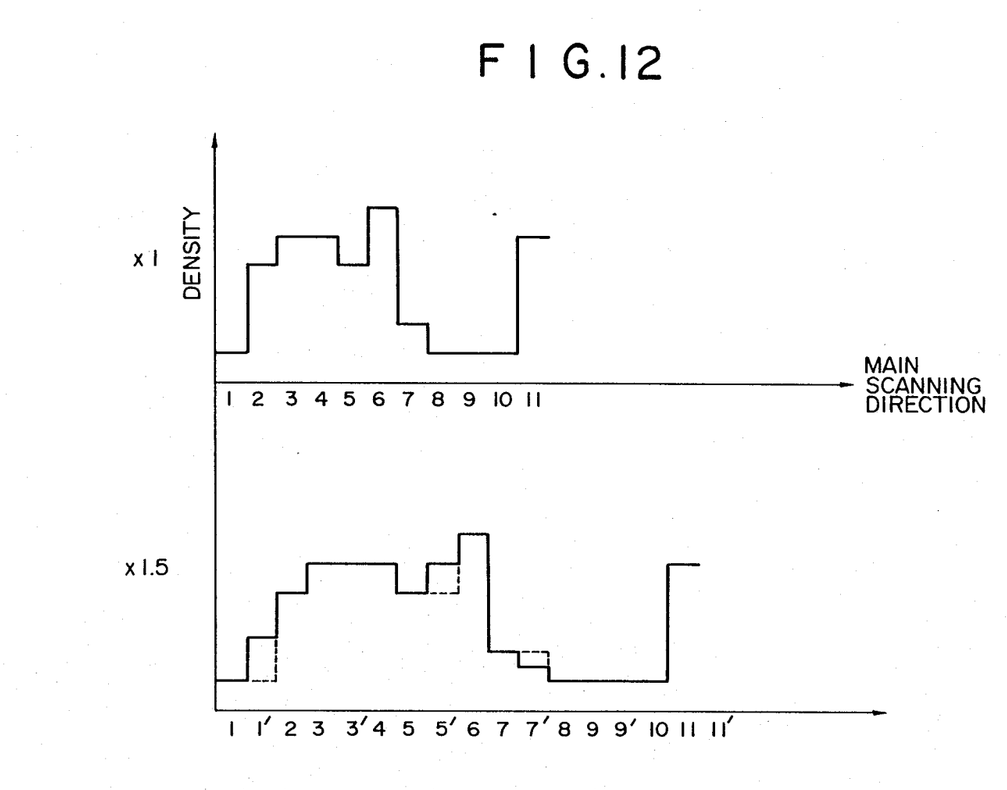
FIG. 12 is an illustration which is useful for explaining the effect of the structure shown in FIG. 11 when data is enlarged in size in the main scanning direction.
Figure 13:
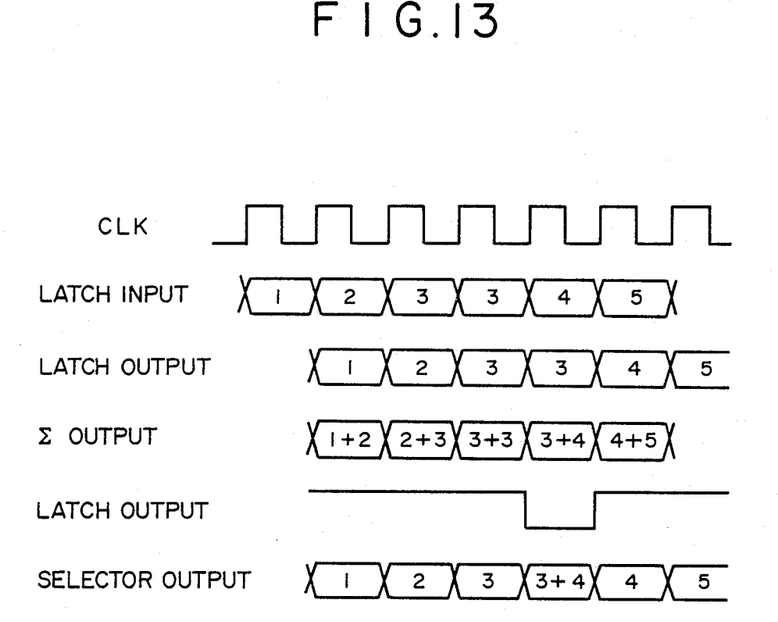
FIG. 13 is a timing chart useful for understanding the operation of the structure shown in FIG. 11.

Now, if a size enlargement operation is carried out as described above, the ups and downs in density level become conspicuous in the main scanning direction as shown in FIG. 12, which brings about a deterioration in the quality of a resulting image. In order to cope with this, in accordance with a further aspect of the present invention, use is made of the previously described read CLK. This aspect of the present invention will be described with reference to FIG. 11 which shows in block form a density magnification unit in a size enlargement mode. As shown in FIG. 11, read CLK A and B is selected by a selector 40 and this is latched into a latch 41 in synchronism with 16M CLK. On the other hand, an enlargement data is latched into a latch 42, an output of which is input into a selector 43. On the other hand, an average between the latch output from the latch 42 and the previous data is calculated and the average thus obtained is input into a selector 43. In this case, if it is so structured that an average data is output only at a point of change, there is obtained an output which preserves the original density information and has no conspicuous ups and downs in density level. Thus, detection of a point of change is carried out by the latch 41 which supplies as its output a select signal to the selector 43. As a result, the selector 43 outputs image data which is averaged only at its points of change as shown in the timing chart of FIG. 13.

As described above, in accordance with this aspect of the present invention, density magnification can be carried out at points of change with a simple structure, and no problem arises even if the enlargement data, which is to become CLK of the before-mentioned ROM data, is a step (e.g., 1% step).

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. An image processing system comprising:
   supplying means for supplying signification data;
   storing means for storing image data;
   read/write controlling means for controlling a read/write operation of said storing means using said magnification data supplied from said supplying means as an address clock;
   averaging means for averaging magnified data in a predetermined manner to produce an average data during a size enlargement mode; and
   selecting means for selecting either one of said averaged data and a corresponding non-magnified data in accordance with a clock derived from the magnification data obtained from said supplying means.

2. The system of claim 1, further comprising: a first plurality of image sensors for optically reading an original to produce image data line by line, said first plurality of image sensors reading a line of said original at the same time in a forward direction along said line.

3. The system of claim 1, wherein said storing means includes a pair of image memories, each storing either a left-half or right-half of said image data of one line as divided at a center thereof.

* * * * *